March 14, 1967        D. L. COLE        3,309,712

ELECTROLUMINESCENT DYNAMIC DISPLAY DEVICE

Filed June 5, 1963        4 Sheets-Sheet 1

INVENTOR
David L. Cole
BY
*Robert E. Strausser*
ATTORNEY

March 14, 1967 D. L. COLE 3,309,712
ELECTROLUMINESCENT DYNAMIC DISPLAY DEVICE
Filed June 5, 1963 4 Sheets-Sheet 2

INVENTOR
David L. Cole
BY
*Robert E. Strausser*
ATTORNEY

March 14, 1967  D. L. COLE  3,309,712

ELECTROLUMINESCENT DYNAMIC DISPLAY DEVICE

Filed June 5, 1963  4 Sheets-Sheet 3

INVENTOR
David L. Cole
BY
Robert E. Strauser
ATTORNEY

March 14, 1967     D. L. COLE     3,309,712
ELECTROLUMINESCENT DYNAMIC DISPLAY DEVICE
Filed June 5, 1963     4 Sheets-Sheet 4
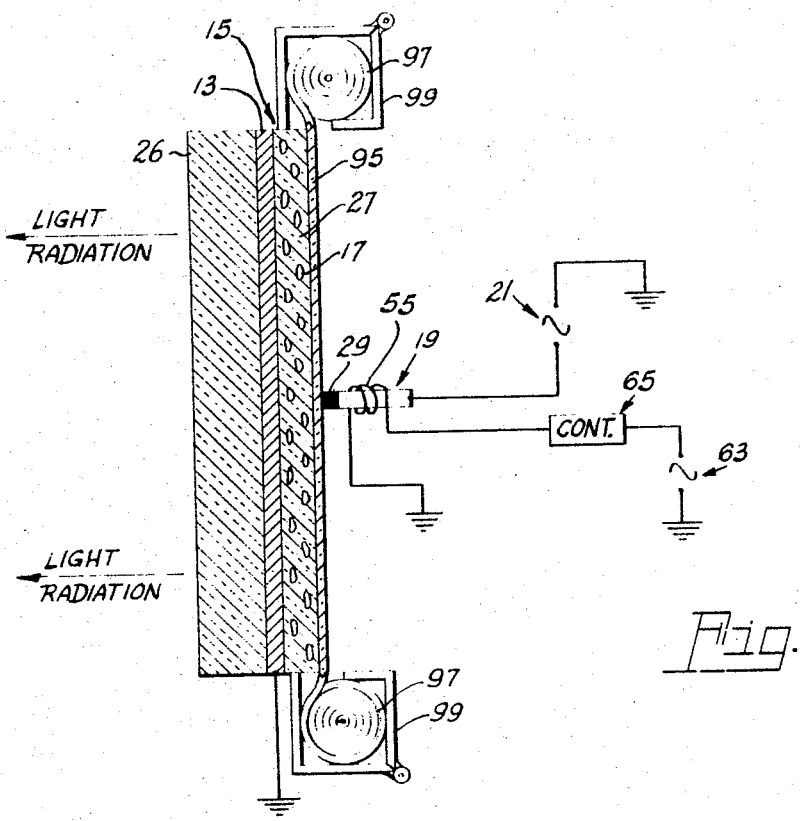
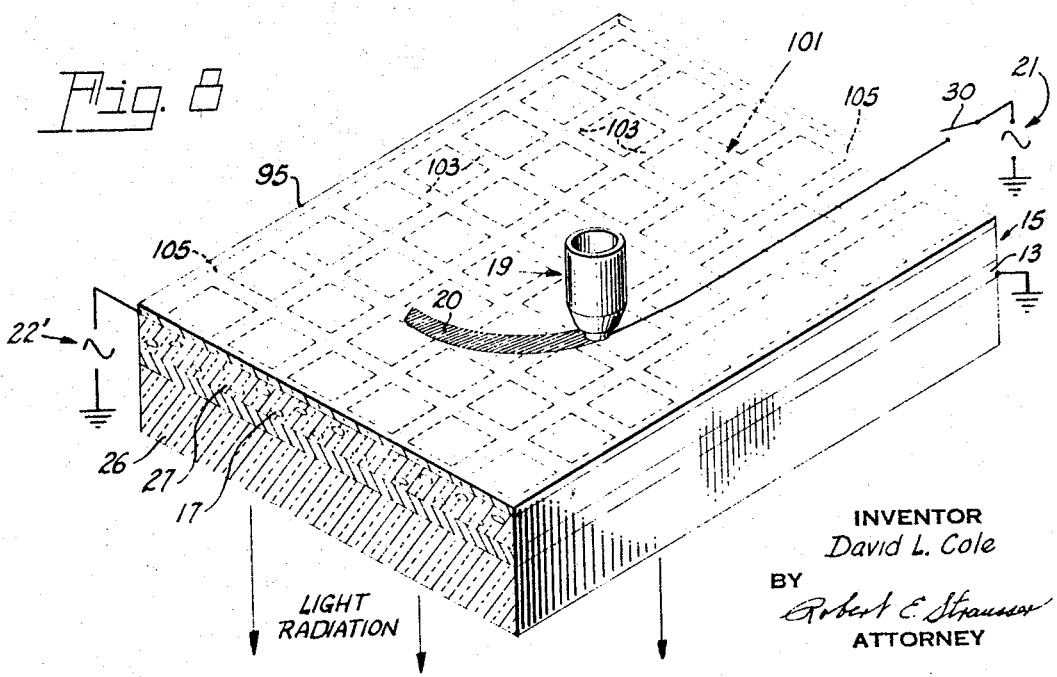
INVENTOR
David L. Cole
BY
Robert E. Strausser
ATTORNEY

United States Patent Office 3,309,712
Patented Mar. 14, 1967

3,309,712
ELECTROLUMINESCENT DYNAMIC DISPLAY DEVICE
David L. Cole, Jenison, Mich., assignor to Sylvania Electric Products Inc., a corporation of Delaware
Filed June 5, 1963, Ser. No. 285,765
14 Claims. (Cl. 346—74)

This invention relates to an information display device and more particularly to an electroluminescent dynamic display device.

Numerous methods have been utilized for displaying static and moving information. Some of the common forms have been illuminated status boards whereon information has been entered manually or by mechanical linkage, combinations of ink dispensing styli with moving paper and optical projection systems. The aforementioned methods have versatility limitations with respect to changing the type of information presentation and are usually not suited to low ambient light operating conditions.

Accordingly, an object of the invention is to reduce the aforementioned disadvantages and to produce an improved display device.

A further object is to provide an internally illuminated dynamic display suited to low ambient light operating conditions.

An additional object is to provide a device having versatility wherein dynamic information in the form of luminescent dots or lines may be comparatively evidenced.

The foregoing objects are achieved in one aspect of the invention by the provision of an electroluminescent dynamic display device wherein a first electrode layer has disposed thereon a dielectric layer of electric field responsive phosphors which is, in turn, contacted by a moveable second electrode of restricted area. Upon the application of a suitable electric potential to the two electrodes the phosphors therebetween are activated to luminescence in specific areas in accordance with the dynamic movements of the second electrode. If a luminescent line is desired, the dispensing of an electrical conductive substance by the second electrode effects a conductive trail in the dielectric which provides for the activation of a luminescent line therein.

For a better understanding of the present invention, together with other and further objects, advantages and capabilities thereof, reference is made to the following disclosure and appended claims in connection with the accompanying drawings in which:

FIG. 7 is a sectional view showing one means for removing recorded information from the device; and FIG. 8 is a perspective view illustrating another alternate embodiment of the invention.

Figure 1:
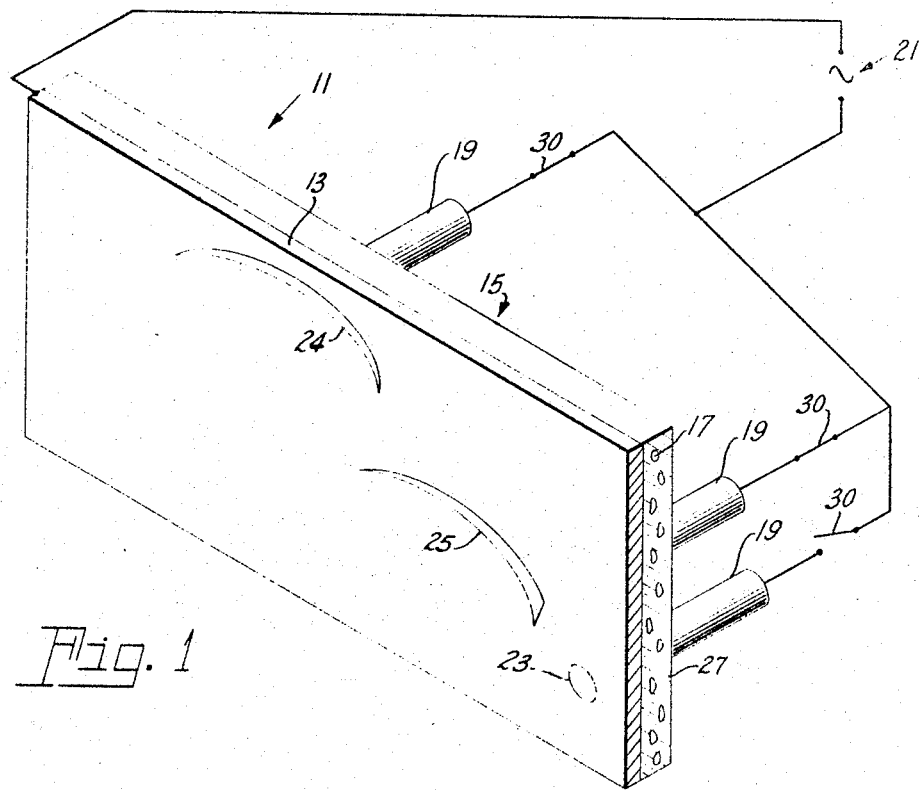
FIG. 1 is a perspective view showing types of luminescent areas which may be utilized in dynamic presentation.

Referring to FIG. 1 there is shown a simple embodiment of the display device 11 wherein an electrically conductive layer or first electrode 13 is contiguously joined to a dielectric layer 15 made up of electric field responsive phosphor particles 17.

In electrical contact with the dielectric layer 15 may be one or more second electrodes 19 having restrictive contact areas and formed for individual selective movement on dielectric layer 15. When a suitable electric potential is supplied by power source 21 to the first electrode 13 and through switching means 30 to one or more parallel connected second electrodes 19, the dielectric phosphor areas immediately between the first and second electrodes are activated by the electric field therebetween to a state of luminescence. Movement of the second electrodes 19, by means not shown in FIG. 1, will produce various dynamic displays 23, 24, 25 to be fully described later. Depending upon the desired requirements, the display can be made visible from one or both sides of the device. Positioning is no deterrent. As shown in FIG. 1. the first electrode 13 is of transparent material such as tin oxide and therefore the luminescent display is visible from either side. If the electrode is a piece of solid metal, chosen to impart rigidity to the device, the display would be visible only from the dielectric 17 side.

Figure 2:
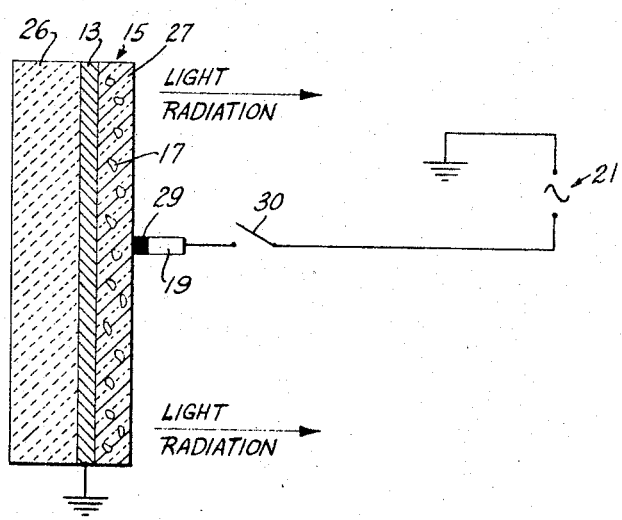
FIG. 2 is a sectional view showing one embodiment of the invention.

In FIG. 2 an insulative substrate 26 as of plastic or ceramic is utilized as a backing. Again, dependent upon usage, the substrate may be transparent, translucent or opaque. In the embodiment illustrated in FIG. 2 the substrate 26 is a piece of soda lime glass of ⅛ inch thickness. Applied to one surface thereof is the electrically conductive material comprising the first electrode 13. This material may be a vapor deposited metal such as, for example, a thin opaque layer of bright gold. Overlaying the first electrode is the phosphor dielectric layer 15 wherein reside the electric field responsive phosphors 17. To facilitate a satisfactory contact relationship between the phosphor dielectric layer 15 and the second electrode 19 a smooth abrasion-resistant surface is necessitated. To achieve such a surface condition and to protect the phosphor particles 17 from moisture penetration, the respective phosphors are usually embedded in a plastic or ceramic dielectric material 27. For example, a weight mixture of approximately 50/50 leadless glass frit and copper activated zinc sulfide in a isopropyl alcohol hexylene glycol vehicle is spray applied as a layer upon the gold first electrode 13 and heated to a temperature sufficient to vitrify the frit and embed the phosphor particles therein to form a ceramic dielectric 15 of uniform thickness. This ceramic dielectric medium affords a smooth and durable surface suitable for contact with the moveable second electrode 19 which has a terminal portion 29 formed of a material suitable for sliding non-abrasive contact such as, for example, conductive rubber.

An EL electrical potential supply means 21, for example one having an output of 250 v., 400 cycles, is connected to the two electrodes; the high potential side being connected through switching means 30 to the second electrode and the ground side to the first electrode. The electric field set up in the dielectric between the two electrodes activate the phosphors in the area immediately therebetween to a state of luminescence. The copper activated zinc sulfide phosphors will emit a green luminescence in the presence of the abovementioned potential which is considered optimum for brightness stability and endurance of the phosphors. The luminescent area 23 can be made dynamic by manually or mechanically moving the second electrode 19 in electrical contact relationship with the dielectric 15. The shape or configuration of the luminescent area is in accordance with the configuration of the terminal contact area of the second electrode. A plurality of second electrodes, in parallel electrical connection, can be independently energized to produce a dynamic display of multiple luminescent areas.

Light from the electroluminescent display device as shown in FIG. 2 will be emitted outwardly from the dielectric 15 since the first electrode 13 is opaque. The reflective quality of this first electrode layer enhances the brightness of the luminescent display.

If a luminescent line 24 is desired as shown in FIG. 1, the terminal portion 29 of the second electrode 19 is formed to terminally dispense an electrically conductive substance as a second electrode trail on the dielectric layer as the electrode contactingly moves thereon. As long as the second electrode 19 makes contact with the conductive trail the whole of the same functions at second electrode potential and causes luminescence of the phosphors adjacent thereto evidenced in a progressive dynamic portrayal. Means for dispensing a conductive trail of this type will be described later.

Figure 3:
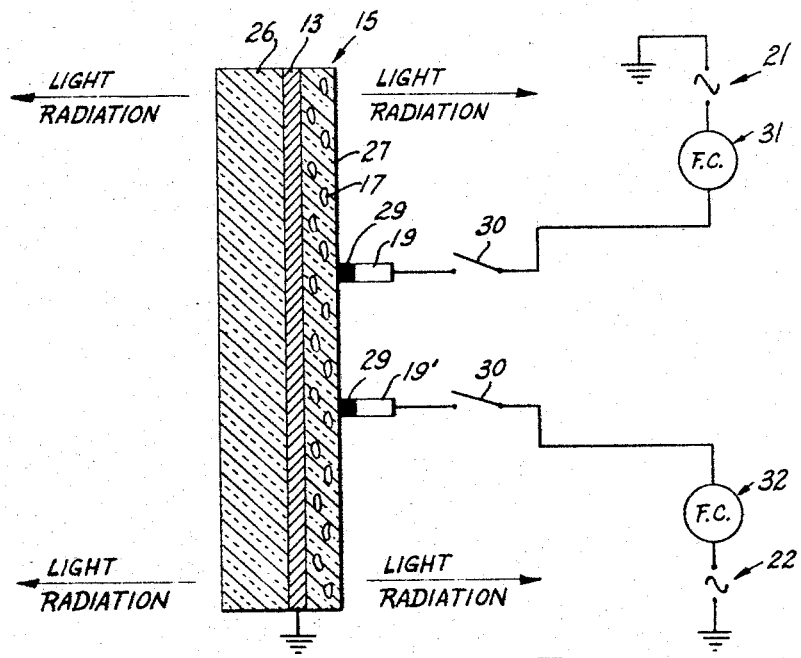
FIG. 3 is a sectional view showing means for achieving differential coloration of luminescent areas.

An alternate embodiment is shown in FIG. 3. The transparent glass substrate 26 has a transparent first electrode 13 disposed thereon. This electrode may be, for example, a film-like layer of tin oxide so formed by heating the substrate and spraying it with a stannic chloride solution. A dielectric layer 15 having electric field responsive phosphors therein is next applied in a manner previously explained. The device so constructed will radiate light from either side, thus the ensuing luminescent display can be viewed in like manner. Two independently connected second electrodes 19 and 19' are shown in FIG. 3. As previously mentioned each of these electrodes could have a plurality of similar electrodes connected in parallel if so desired. A first second electrode 19 is connected to a first EL electrical potential supply source 21 which, for example may have an output of 250 v., 400 cycles which will cause the copper activated zinc sulfide phosphors 17 to luminesce with a green radiance. A second second electrode 19' is similarly connected to a second EL electrical potential supply source 22 which, for example may have an output of 250 v., 200 cycles which will cause the same phosphors 17 to luminesce in a second coloration with a less brilliant green-yellow radiance. Thus a dynamic electroluminescent display of contrasting colors is evidenced wherein the differences in degree of brightness and color produces luminescent areas for differential comparison. Further variability of brightness and hue can be regulated by the individual frequency controls 31 and 32 associated with electrical potential supply means 21 and 22 respectively. The areas for movement of second electrodes 19 and 19' are limited by moving means involved which will be later described.

Figure 4:
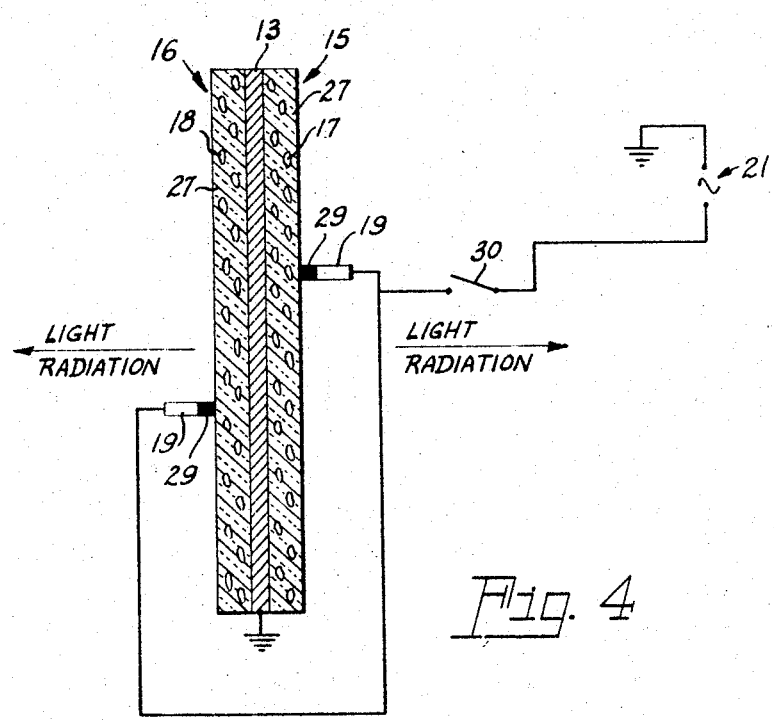
FIG. 4 is a sectional view illustrating an alternate embodiment of the invention.

In the embodiment shown in FIG. 4 a transparent first electrode 13 as of tin oxide is suitably disposed on a first ceramic dielectric 15 containing one of a number of electric field responsive phosphors 17 which may be, for example, zinc sulfide activated with .05% copper. A second ceramic dielectric layer 16 is formed to contiguously overlay the opposite side of the first electrode 13 so that it is actually sandwiched between dielectric layers 15 and 16 thereby forming a translucent structure capable of being viewed from either side. The second dielectric layer 16 contains one of a number of electric field responsive phosphors 18, differing chemically from the electric field responsive phosphors 17 contained in the first dielectric layer 15, which can be, for example, zinc sulfide activated with a lower percentage of copper, such as, .02%.

Electrical potential supply source 21 may have a plurality of parallel connected second electrodes 19 positioned to movingly contact the dielectrics 15 and 16. At 250 v., 400 cycles the phosphors 17 in dielectric 15 will provide a green luminescence, and at the same potential the phosphors 18 in dielectric 16 will provide a contrasting blue luminescence thereby making possible a dynamic display of differential coloration. Since each of the dielectric layers 15 and 16 is translucent, the luminescence of the phosphors in the layer furthest removed from the viewer is somewhat attenuated and diffused by passage through the layer nearest the viewer, there is thusly provided an additional comparison feature. It is evident that like phosphors could be utilized in both the first dielectric 15 and second dielectric 16; in which case, the above-mentioned attenuation and diffusion characteristics would enable differentiation of the respective displays. The movements of the individual electrodes, in the device as shown in FIG. 4, are each independent of the other and therefore have unrestricted movement over the whole of the respective dielectric.

Figure 5:
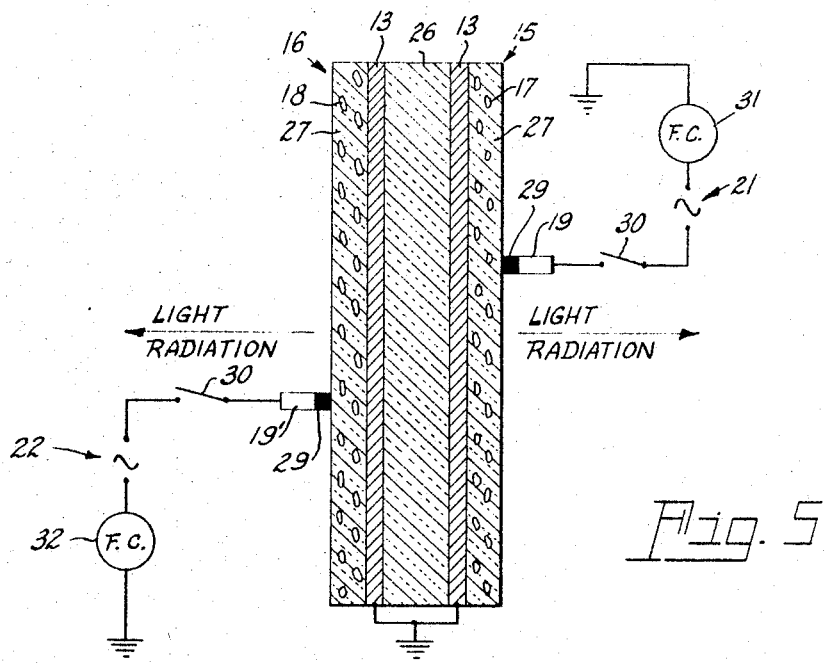
FIG. 5 is a sectional view showing a third alternate embodiment of the invention.

FIG. 5 illustrates a modification of the device shown in FIG. 4 wherein a basic substrate adds ruggedness to the device. The transparent glass substrate 26 has transparent first and second first electrodes 13 and 13' respectively of, for example, tin oxide suitably disposed on either side thereof. First and second ceramic dielectric layers 15 and 16 respectively, having chemically different electric field responsive phosphors 17 and 18 of the types utilized in FIG. 4 embedded therein, are conventionally formed on the respective first and second first electrodes 13 and 13'. A first EL electrical potential supply source 22 with its associated frequency control 32 are electrically connected with a first second electrode 19 and a second second electrode 19' respectively in a manner similar to that used with the device as shown in FIG. 3; except that the first second electrode and the second second electrode are each associated with individual dielectric layers. The facility for achieving differences in frequency between the two potential sources and individual means for the variable control of each makes possible a versatile range of phosphor luminescence in both brightness and hue whereby functionally independent luminescent areas of contrasting first and second colorations may be evidenced. If so desired, phosphors of like chemical compounding may be contained in dielectric layers 15 and 16; in which case, contrasting colorations of luminescence would be dependent upon the differences in electrical fields supplied by the individual electrical potential supplies.

Figure 6:
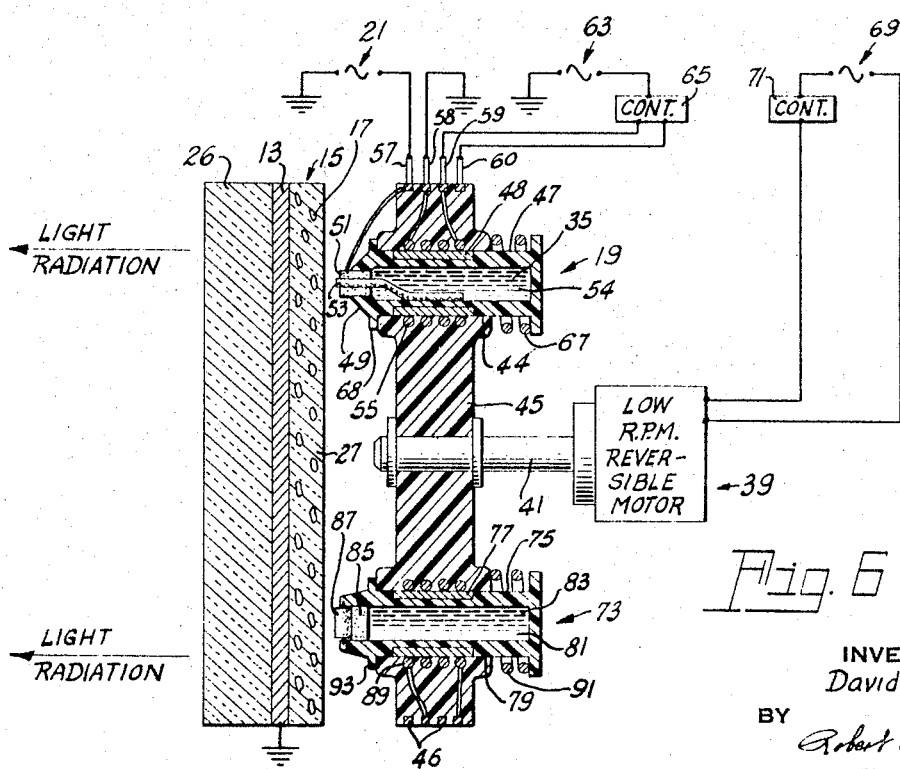
FIG. 6 is a sectional view detailing a type of second electrode and means for imparting dynamic movement to the device.

FIG. 6 details a type of second electrode 19 and means for moving same with reference to the dielectric 15. Transparent substrate 26, transparent first electrode 13 and ceramic dielectric 15 with electric field responsive phosphors 17 embedded therein are as previously described. Second electrode 19 as herein described is of the type formed to terminally dispense an electrically conductive substance 35 to effect a second electrode conductive trail 24 on the surface of dielectric 15.

Means for imparting dynamic movement to the second electrode 19 may be manual, mechanical or electromechanical. While not shown, mechanically actuated arms of pantograph design have been successfully utilized. One type of electromechanical actuation is illustrated in the form of an electric motor 39; the shaft 41 of which is secured to the center of an insulative wheel 45 which has provisions near its periphery for supporting the second electrode 19. Any motion of wheel 45 imparts arcuate movement to the second electrode 19. The peripheral rim of the wheel has embedded therein a plurality of spaced electrically conductive bands or rails 46 to provide suitable surfaces for sliding electrical contact with a group of externally positioned contactors 57, 58, 59 and 60 which are connected to electrical potential and control sources.

In greater detail, second electrode 19 is a rigid plastic cylinder 47 having a band of ferromagnetic material 48 molded exteriorly thereto and formed for a degree of slidable engagement within a suitable bore 44 in insulative wheel 45. The restricted terminal 49 is formed to engage an electrode element 51, such as a piece of conductive rubber of discrete configuration, which has a wick 53 axially embedded therein. The wick functions as a fluid conductor for the controlled terminal dispensing of a flowable electrical conductive substance 35 contained within the electrode cavity 54. When the electrode element 51 makes contact with the surface of dielectric 15 the flowable conductive substance is dispensed in the form of an electrically conductive trail upon the surface of dielectric 15, to be more fully described later.

As previously stated, the second electrode cylinder 19 is formed for slidable engagement within bore 44 wherein there is mounted a solenoid helix 55 which is connected to two of the rails 46 making electrical contact with contactors 58 and 59. The solenoid electrical potential source 63 in conjunction with associated control 65 furnishes power as selectively desired to sliding contactors 58 and 59 thereby activating solenoid helix 55 which, in turn, shifts the second electrode 19 to a contact position with the surface of dielectric layer 15. This closes the circuit of the EL electrical potential source 21 which is connected through sliding contactor 57 to one of the rails 46 and thence to electrode element 51, whereby phosphor particles 17 are excited to a state of luminescence. Upon designation by solenoid control 65, the solenoid circuit is opened which permits the counteracting expansion of compression helix 67 to withdraw second electrode 19 from the surface of dielectric 15 until stopped by an electrode projecting rim 68 thereby opening the EL electrical potential supply circuit discontinuing excitation of the phosphors.

Arcuate movement is imparted to second electrode 19 by motor 39 in conjunction with motor electrical potential source 69 and associated control 71 thereby facilitating the application of a second electrode conductive trail which effects a resultant luminescent trail 24 as illustrated in FIG. 1.

Electrical conductive substances 35 suitable for this usage may be of three varieties, namely, those that leave a permanent or a semi-permanent electrically conductive trail 24, and those which exhibit a controlled rate of electrical decay as evidenced by a receding conductive trail 25. The term permanent is self-explanatory and will be fully covered later. The term semi-permanent, as used herein, refers to a type of electrically conductive trail that exhibits sufficient permanency to be fully adequate for the intended usage, but one that may be totally removed or erased by suitable erasure means without harm to the dielectric surface. The semi-permanent type of electrical conductive trail is capable of functioning as a second electrode in its entirety, upon the application of a suitable electrical potential, until removed or erased from the dielectric. Materials exemplifying this usage may include conductive silver air drying pastes or liquids and organic or metallic containing inks. The receding type of conductive trail may be composed largely of evaporative materials having pronounced conductivity in the liquid or initially applied state and exhibiting sequential electrical decay as the solvents evaporate therefrom. Such materials may include saline solutions of which the solvents may be water or acetone.

If it is desired to remove or erase the conductive trails from the surface of dielectric 15, erasure means 73 may be incorporated into the insulative wheel 45 and radially oriented to be arcuately coincidental with the second electrode 19. Erasure means 73 has constructional features somewhat similar to those of electrode structure 19. The main body is a rigid plastic cylinder 75 having a band of ferromagnetic material 77 molded exteriorly thereto and formed for a degree of slidable engagement within a suitably oriented bore 79 in insulative wheel 45. The internal cavity 81 contains a cleaning material 83 such as alcohol, carbon tetrachloride or other solvent chemically compatible for removal of the electrical conductive trail. This cleaning solvent feeds through a fiber dispenser 85 onto a contacting felt-type roller 87 suitably positioned in the terminal end of the erasure cylinder 75.

A solenoid helix 89 is mounted within bore 79 and connected to two of the rails 46 making electrical contact with contactors 58 and 60. The solenoid electrical potential source 63 in association with control 65 furnishes power as selectively desired to the sliding contactors 58 and 60 thereby activating the solenoid helix 89. This shifts erasure means 73 to provide contact of the cleaning roller 87 with the surface of dielectric 15. Proper activation of motor 39 provides arcuate movement for erasure, thus the previously disposed conductive trail is removed from the surface of the dielectric.

Upon completion of the erasure, the circuit for solenoid 89 is opened by control 65 permitting the expansion of compression helix 91 to withdraw erasure means 73 from surface contact with the dielectric until stopped by erasure projecting rim 93.

In FIG. 7 there is shown means whereby a permanent record of the second electrode trail may be removed from the device for subsequent reference. The basic structure comprising the transparent substrate 26, the transparent first electrode 13 and the dielectric layer 15 with electric field responsive phosphors 17 embedded therein is similar to that previously described. A replaceable transparent dielectric layer 95 such as pliable plastic film is drawn taut in contiguous relationship with the dielectric layer 15. A plastic suitable for this usage may be "Mylar" polyester film manufactured by the E. I. du Pont de Nemours & Co., Inc., Wilmington, Del. The plastic dielectric 95 may be utilized as a single replaceable sheet or may be in the form of rolled material 97, as shown in FIG. 7, contained in oppositely positioned hinged magazines 99. This facilitates the removing and replacing of the transparent dielectric layer 95 as an entirety.

The second electrode 19 is of the variety previously described which dispenses an electrically conductive substance 35 as a permanent second electrode trail. In this instance, the permanent conductive substance may be carbon or metal containing ink which may function both as an electrically conductive second electrode trail and a permanent visual record of the same.

A solenoid helix 55, as described in FIG. 6, affords means for making and breaking contact between the second electrode 19 and the surface of the plastic dielectric layer 95, when activated by solenoid control 65 in conjunction with the electrical potential supply source 63.

Electroluminescent response of the phosphors 17 contained between the first electrode 14 and the second electrode 19 is as previously explained.

Means for imparting dynamic movement to the second electrode is not shown, but may be of the types heretofore described.

An embodiment of the invention incorporating additional comparative means is illustrated in FIG. 8. The basic structure is similar to that already described and includes, namely, the transparent substrate 26, the transparent first electrode 13, the dielectric layer 15 with electric field responsive phosphors 17 embedded therein, the replaceable plastic dielectric layer 95 disposed thereupon, and the second electrode 19, of the type described with reference to FIGURES 6 and 7, capable of dispensing a permanent electrically conductive trail 20.

The replaceable transparent dielectric layer 95 may be of the "Mylar" polyester variety previously mentioned except, that in this instance, there is an electrically conductive grid-like pattern or grid-second electrode 101 permanently embossed or imprinted on the one surface thereof, i.e. the surface contiguous to the phosphor containing dielectric layer 15.

This imprinted grid-second electrode 101 is formed of a plurality of intersecting conductive stripes or lines 103 of suitably selected electrically conductive organic-metallic inks. The ends of the intersecting conductive lines 103 integrally unite with a peripheral or bordering conductive stripe 105 whereby means is provided for facilitating common electrical connections for each of the conductive lines 103. Structural means for tautening the replaceable plastic dielectric layer 95 are not shown.

A grid-second electrode electrical potential supply source 22' is connected across the peripheral conductive stripe 105 and the first electrode 13 whereby an illuminescent grid-like pattern is evidenced in accordance with the electrode pattern 101. The thickness of the plastic dielectric layer 95 insulates the grid-second electrode pattern 101 from the second electrode 19 which is connected to one side of electrical potential supply means 21. Thus there are two separate and distinct second electrode patterns, namely, the dynamically applied second electrode conductive trail 20 and the static grid pattern 101. Varying either or both of the electrical potential supply sources 21 and 22' as to voltage and/or frequency provides different excitation conditions for the phosphors 17 thereby producing resultant contrasting luminescences of different colors.

The replaceable transparent second dielectric layer 95 is removed in its entirety thus affording a permanent visual record whereby the electrode trail 20 may be directly compared with its associated imprinted grid 101. This embodiment provides for the use of a wide variety of grid patterns adapted specifically to the type of information recorded.

Thus there is provided an improved internally illuminated display device suited to low ambient light operating conditions. The device is capable of wide versatility wherein dynamic information in the form of luminescent dots or lines may be comparatively evidenced. As desired, the displayed information may be permanent, semi-permanent or temporary.

While there have been shown and described what are at present considered the preferred embodiments of the invention, it will be obvious to those skilled in the art that various changes and modifications may be made therein without departing from the scope of the invention as defined by the appended claims.

What is claimed is:

1. An electroluminescent dynamic display device comprising:
   a first electrically conductive layer formed to provide a first electrode;
   a dielectric layer of electric field responsive phosphors disposed upon said first electrode; and
   a second electrode of restricted terminal area in contact with said dielectric layer and formed for movement thereupon to dispense a conductive substance having a controlled rate of electrical decay to provide electric field actuated luminescence of the phosphors in accordance with the dynamic movements of said second electrode when an electrical potential difference is applied between said first and second electrodes.

2. An electroluminescent dynamic display device comprising:
   a first electrically conductive layer formed to provide a first electrode;
   a dielectric layer of electric field responsive phosphors disposed upon said first electrode;
   a second electrode of restricted terminal area in contact with said dielectric layer and formed for movement thereupon to discretely dispense a conductive substance having a controlled rate of electrical decay;
   means for imparting dynamic movement to said second electrode; and
   electrical potential supply means interconnecting said first and said second electrodes to provide the electrical field for actuating phosphor luminescence in accordance with the dynamic movements of said second electrode.

3. An electroluminescent dynamic display device comprising:
   an insulative substrate having first and second substantially parallel surfaces;
   a first electrically conductive layer formed on the first surface of said substrate to provide a first electrode;
   a dielectric layer having electric field responsive phosphors embedded therein disposed upon said first electrode;
   a second electrode of restricted terminal area in contact with said dielectric layer and formed for movement thereupon to discretely dispense a conductive substance having a controlled rate of electrical decay;
   means for imparting dynamic movement to said second electrode; and
   electrical potential supply means interconnecting said first and said second electrodes to provide the electrical field for actuating phosphor luminescence in accordance with the dynamic movements of said second electrode.

4. An electroluminescent dynamic display device comprising:
   a transparent insulative substrate having first and second substantially parallel surfaces;
   a transparent first electrically conductive layer formed on the first surface of said substrate to provide a first electrode;
   a ceramic dielectric layer having electric field responsive phosphors embedded therein disposed upon said first electrode;
   a second electrode of restricted terminal area in contact with said dielectric layer and formed for movement thereupon to discretely dispense a conductive substance having a controlled rate of electrical decay;
   electro-mechanical means for imparting dynamic movement to said second electrode; and
   electrical potential supply means interconnecting said first and said second electrodes to provide the electrical field for actuating phosphor luminescence in accordance with the dynamic movements of said second electrode.

5. An electroluminescent dynamic display device comprising:
   an insulative substrate having first and second substantially parallel surfaces;
   a first electrically conductive layer formed on the first surface of said substrate to provide a first electrode;
   a dielectric layer having electric field responsive phosphors embedded therein disposed upon said first electrode;
   a second electrode of restricted terminal area in contact with said dielectric layer and formed for movement thereupon, said second electrode being further formed to terminally dispense an electrically conductive substance having a controlled rate of electrical decay as a second electrode trail on said dielectric layer;
   means for imparting dynamic movement to said second electrode; and
   electrical potential supply means interconnecting said first and said second electrodes to provide the electrical field for actuating phosphor luminescence in accordance with the dynamic movements of said second electrode and resultant conductive trail.

6. An electroluminescent dynamic display device comprising:
   an insulative substrate having first and second substantially parallel surfaces;
   a transparent first electrically conductive layer formed on the first surface of said substrate to provide a first electrode;
   a dielectric layer having electric field responsive phosphors embedded therein disposed upon said first electrode;
   a first second electrode of restricted terminal area in contact with said dielectric layer and formed for movement thereupon, said first second electrode being further formed to terminally dispense an electrically conductive substance as a first second electrode trail on said dielectric layer;
   means for imparting dynamic movement to said first second electrode;
   first electrical potential supply means interconnecting said first electrode and said first second electrode to provide a first electrical field for actuating phosphor luminescence of a first coloration in accordance with the dynamic movements of said first second electrode and resultant conductive trail;

a second second electrode of restricted terminal area in contact with said dielectric layer and formed for movement thereupon in areas free of first second electrode trail, said second second electrode being further formed to terminally dispense an electrically conductive substance having a controlled rate of electrical decay as a second second electrode trail on said dielectric layer;

means for imparting dynamic movement to said second second electrode; and second electrical potential supply means interconnecting said first electrode and said second second electrode to provide a second electrical field for actuating phosphor luminescence of a second coloration in accordance with the dynamic movements of said second second electrode and resultant conductive trail whereby a plurality of functionally independent luminescent areas of contrasting colors may be provided.

7. An electroluminescent dynamic display device comprising:

a transparent first electrically conductive layer formed to provide a transparent first electrode having two surfaces;

a first dielectric layer of electric field responsive phosphors disposed upon one of said surfaces of said first electrode;

a second dielectric layer of electric field responsive phosphors disposed upon the other of said surfaces of said first electrode;

a pair of parallel connected second electrodes having restricted terminal areas for contacting said dielectric layers and formed for movement thereupon, one of said second electrodes oriented for electrical contact relationship with said first dielectric layer and the other of said second electrodes oriented for electrical contact relationship with said second dielectric layer, at least one of said second electrodes dispensing a conductive substance having a controlled rate of electrical decay;

means for imparting independent dynamic movement to each of said second electrodes; and electrical potential supply means interconnecting said first electrode and said second electrodes to provide separate electrical fields for activating phosphor luminescence in accordance with the dynamic movements of said individual second electrodes whereby a plurality of functionally independent luminescent areas are provided.

8. An electroluminescent dynamic display device comprising:

a transparent first electrically conductive layer formed to provide a transparent first electrode having two surfaces;

a first dielectric layer of electric field responsive phosphors disposed upon one of said surfaces of said first electrode;

a second dielectric layer of electric field responsive phosphors differing chemically from said electric field responsive phosphors of said first dielectric layer, disposed upon the other of said surfaces of said first electrode;

a pair of parallel connected second electrodes having restricted terminal areas for contacting said dielectric layers and formed for movement thereupon, one of said second electrodes oriented for electrical contact relationship with said first dielectric layer and the other of said second electrodes oriented for electrical contact relationship with said second dielectric layer, at least one of said second electrodes dispensing a conductive substance having a controlled rate of electrical decay;

means for imparting independent dynamic movement to each of said second electrodes; and electrical potential supply means interconnecting said first electrode and said second electrodes to provide separate electrical fields for activating phosphor luminescence in accordance with the dynamic movements of said individual second electrodes whereby a plurality of functionally independent luminescent areas of differential colors may be provided.

9. An electroluminescent dynamic display device comprising:

an insulative substrate having first and second substantially parallel surfaces;

a transparent first electrically conductive layer formed on the first surface of said substrate to provide a first electrode;

a first dielectric layer having electric field responsive phosphors embedded therein disposed upon said first electrode;

a first second electrode of restricted terminal area in contact with said first dielectric layer and formed for movement thereupon;

means for imparting dynamic movement to said second electrode;

electrical potential supply means interconnecting said first electrode and said first second electrode to provide an electrical field for actuating phosphor luminescence in accordance with the dynamic movements of said first second electrode;

a transparent second electrically conductive layer formed on the second surface of said substrate to provide a second first electrode;

a second dielectric layer having electric field responsive phosphors embedded therein disposed upon said second first electrode;

a second second electrode of restricted terminal area in contact with said second dielectric layer and formed for movement thereupon; at least one of said second electrodes dispensing a conductive substance having a controlled rate of electrical decay;

means for imparting dynamic movement to said second second electrode; and electrical potential supply means interconnecting said second first electrode and said second second electrode to provide an electrical field for activating phosphor luminescence in accordance with the dynamic movements of said second second electrode whereby a plurality of functionally independent luminescent areas may be provided.

10. An electroluminescent dynamic display device comprising:

an insulative substrate having first and second substantially parallel surfaces;

a transparent first electrically conductive layer formed on the first surface of said substrate to provide a first electrode;

a first dielectric layer having electric field responsive phosphors embedded therein disposed upon said first electrode;

a first second electrode of restricted terminal area in contact with said first dielectric layer and formed for movement thereupon;

means for imparting dynamic movement to said second electrode;

first electrical potential supply means interconnecting said first electrode and said first second electrode to provide a first electrical field for actuating a phosphor luminescence of a first color in accordance with the dynamic movements of said first second electrode;

a transparent second electrically conductive layer formed on the second surface of said substrate to provide a second first electrode;

a second dielectric layer having electric field responsive phosphors embedded therein disposed upon said second first electrode;

a second second electrode of restricted terminal area in contact with said second dielectric layer and formed for movement thereupon; at least one of said second electrodes dispensing a conductive substance having a controlled rate of electrical decay;

means for imparting dynamic movement to said second second electrode; and second electrical potential supply means interconnecting said second first electrode and said second second electrode to provide a second electrical field for actuating a phosphor luminescence of a second color in accordance with the dynamic movements of said second second electrode whereby a plurality of functionally independent luminescent areas of contrasting colors may be provided.

11. An electroluminescent dynamic display device comprising:

an insulative substrate having first and second substantially parallel surfaces;

a transparent first electrically conductive layer formed on the first surface of said substrate to provide a first electrode;

a first dielectric layer of electric field responsive phosphors chemically compounded to effect a first type of color response disposed upon said first electrode;

a first second electrode of restricted terminal area in contact with said first dielectric layer and formed for movement thereupon;

means for imparting dynamic movement to said second electrode;

electrical potential supply means interconnecting said first electrode and said first second electrode to provide an electrical field for actuating phosphor luminescence of first type of color response in accordance with the dynamic movements of said second electrode;

a transparent second electrically conductive layer formed on the second surface of said substrate to provide a second first electrode;

a second dielectric layer of electric field responsive phosphors chemically compounded to effect a second type of color response disposed upon said second first electrode;

a second second electrode of restricted terminal area in contact with said second dielectric layer and formed for movement thereupon; at least one of said second electrodes dispensing a conductive substance having a controlled rate of electrical decay;

means for imparting dynamic movement to said second electrode; and electrical potential supply means interconnecting said second first and said second second electrode to provide an electrical field for actuating phosphor luminescence of a second type of color response in accordance with the dynamic movements of said second second electrode whereby a plurality of functionally independent luminescent areas of contrasting colors may be provided.

12. An electroluminescent dynamic display device comprising:

an insulative substrate having first and second substantially parallel surfaces;

a first electrically conductive layer formed on the first surface of said substrate to provide a first electrode;

a dielectric layer having electric field responsive phosphors embedded therein disposed upon said first electrode;

a second electrode of restricted terminal area in contact with said dielectric layer and formed for movement thereupon, said second electrode being further formed to terminally dispense an electrically conductive substance having a controlled rate of electrical decay as a second electrode trail on said dielectric layer;

means for imparting dynamic movement to said second electrode;

electrical potential supply means interconnecting said first and said second electrodes to provide the electrical field for actuating phosphor luminescence in accordance with the dynamic movements of said second electrode and resultant conductive trail; and cleaning means for removing residue of said second electrode trail from said dielectric layer.

13. An electroluminescent dynamic display device comprising:

an insulative substrate having first and second substantially parallel surfaces;

a first electrically conductive layer formed on the first surface of said substrate to provide a first electrode;

a dielectric layer having electric field responsive phosphors embedded therein disposed upon said first electrode;

a second electrode of restricted terminal area in contact with said dielectric layer and formed for movement thereupon, said second electrode being further formed to terminally dispense an electrically conductive substance exhibiting a rate of electrical decay as a receding second electrode trail on said dielectric layer;

means for imparting dynamic movement to said second electrode; and electrical potential supply means interconnecting said first and said second electrodes to provide the electrical field for actuating phosphor luminescence in accordance with the dynamic movements of said second electrode and resultant conductive trail.

14. An electroluminescent dynamic display device comprising:

an insulative substrate having first and second substantially parallel surfaces;

a first electrically conductive layer formed on the first surface of said substrate to provide a first electrode;

a dielectric layer having electric field responsive phosphors embedded therein disposed upon said first electrode;

a second electrode of restricted terminal area in contact with said dielectric layer and formed for movement thereupon, said second electrode being further formed to terminally dispense an electrically conductive saline solution as a receding second electrode trail on said dielectric layer;

means for imparting dynamic movement to said second electrode; and electrical potential supply means interconnecting said first and said second electrodes to provide the electrical field for actuating phosphor luminescence in accordance with the dynamic movements of said second electrode and resultant conductive trail.

References Cited by the Examiner

UNITED STATES PATENTS

| | | | |
|---|---|---|---|
| 2,773,216 | 12/1956 | Edmonds | 40—130 X |
| 2,897,399 | 7/1959 | Garwin et al. | 313—108 X |
| 2,975,318 | 3/1961 | Nicoll | 40—130 |

OTHER REFERENCES

Page 8, February 1959, O'Connell, J. A., Electroluminescent Display Board, IBM Technical Disclosure Bulletin, vol. 1, No. 5.

BERNARD KONICK, *Primary Examiner.*

J. BREIMAYER, *Assistant Examiner.*